(No Model.)

R. M. & J. G. DOWNIE.
VALVE.

No. 454,613. Patented June 23, 1891.

Witnesses
M. Fowler
Wm. Bagger

Inventors
Robert M. Downie and
John G. Downie
By their Attorneys

UNITED STATES PATENT OFFICE.

ROBERT M. DOWNIE AND JOHN G. DOWNIE, OF BEAVER FALLS, PENNSYLVANIA.

VALVE.

SPECIFICATION forming part of Letters Patent No. 454,613, dated June 23, 1891.

Application filed March 27, 1889. Serial No. 305,011. (No model.)

*To all whom it may concern:*

Be it known that we, ROBERT M. DOWNIE and JOHN G. DOWNIE, citizens of the United States, residing at Beaver Falls, in the county of Beaver and State of Pennsylvania, have invented a new and useful Valve, of which the following is a specification.

This invention relates to an improved valve to be used upon the plungers of pumps for oil-wells and other deep wells in which a piston is employed to lift or force the liquid through a cylindrical tube, said valve being also applicable to check-valves that remain motionless in the bottom of cylinders or tanks to prevent the liquid from going back; and the invention consists, essentially, in the construction and arrangement of a conical valve upon a conical seat having ports or openings distributed about its surface.

The invention further consists in certain improvements in the detailed construction of the valve, which will be hereinafter fully described, and particularly pointed out in the claims.

Figure 1:
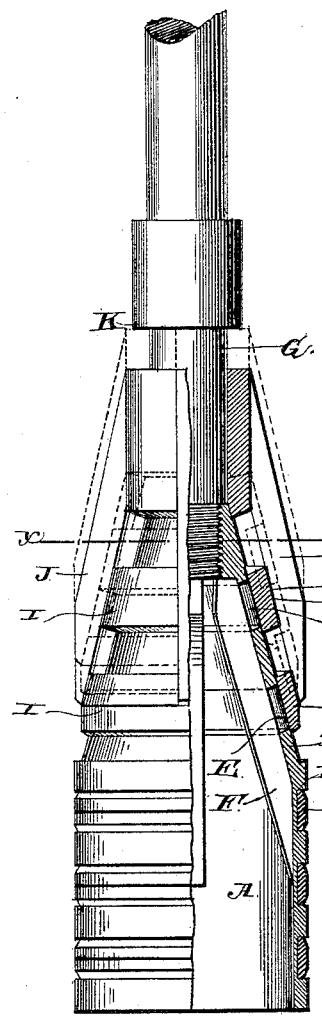
Figure 2:
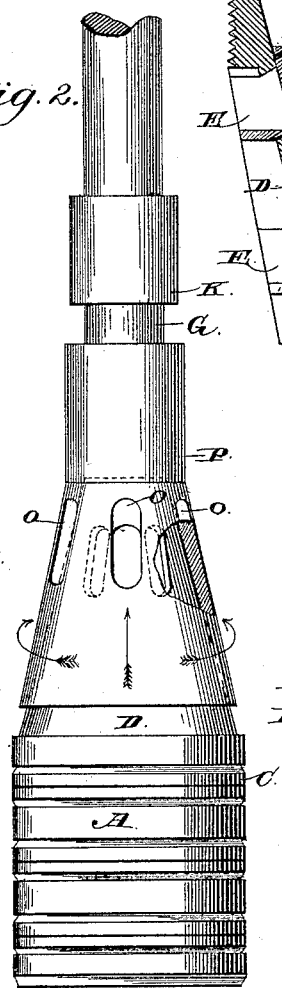
Figure 4:
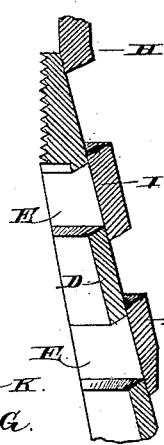
Figure 3:
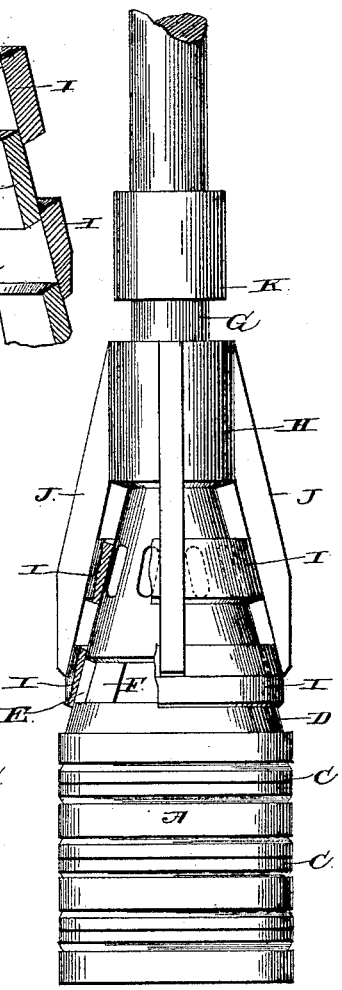
Figure 5:
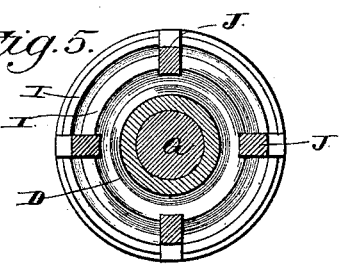

In the drawings, Figure 1 is a side view of a piston or plunger embodying our invention, a part of the same having been broken away for the purpose of illustrating the invention more clearly. Fig. 2 is a similar view illustrating a modification of our invention. Fig. 3 is a similar view illustrating another modification. Fig. 4 is a sectional detail view on a larger scale, to illustrate more clearly the construction of the valve. Fig. 5 is a sectional view taken on the line $x\ x$ of Fig. 1.

The same letters refer to the same parts in all the figures.

A designates the body of the piston or plunger, which is cylindrical in shape and provided with annular grooves B, in which are seated the packing-rings C of ordinary construction. From the upper end of the said cylindrical body extends the tapering or conical portion D, which forms the valve-seat and which is provided with annular slots or openings E E, forming the ports for the passage of the fluid. Upon the inner side of the conical valve-seat a series of ribs or braces F F may be cast or otherwise suitably formed, for the purpose of strengthening the parts and of enabling the slots or ports to be extended around the entire circumference of the conical valve-seat. The upper end of the latter has a screw-threaded socket for the attachment of the plunger-rod G.

H designates the valve, which consists of a conical cage comprising a series of beveled or inclined rings or bands I I, adapted to cover the slots or ports E E and connected by means of ribs or braces J J. The uppermost ring of the valve is fitted upon the plunger-rod, which forms a bearing for the said valve, and a shoulder K upon which limits the motion of said valve in an upward direction.

For the purpose of compensating for wear upon the valve, the upper edges of the rings or bands I I, constituting said valve, are beveled or inclined downwardly and inwardly, so that as the inner surfaces of said rings or bands become worn, a new wearing-surface will constantly be presented without the upper edges of said rings or bands slipping down past the upper ends of the ports or openings and thereby rendering the valve inoperative.

The operation of this form of our improved valve will be readily understood. When the piston or plunger descends in the well, the pressure of the fluid lifts the valve from its seat, thus enabling the fluid to pass through the ports. On the upstroke the valve returns to its seat, closes the ports, and causes the fluid above the plunger to be forced in an upward direction. It will be seen that owing to the conical shape of the valve-seat the ports or openings for the passage of the fluid may made of very much greater extent than the area of the cross-section of a tube that would contain the valve-seat, thus greatly facilitating the passage of the fluid and increasing the working capacity of the plunger. The force required to operate the plunger will also be much reduced, owing to the reduction of the frictional resistance of the fluid passage through the valve-ports.

By the modification of our invention illustrated in Fig. 2, the slots or openings forming the valve-ports instead of being extended circumferentially around the valve-seat, are made in the form of vertical slots adapted to register with corresponding slots O O in the valve P, which in this case consists of a conical casing fitting tightly against the seat.

This valve is not intended to be raised from its seat, but to be rotated thereon by means of a suitable key or wrench, so as to cover or uncover the ports E, as the case may be, and thus permit or prevent the passage of liquid.

By the modification of the invention shown in Fig. 3, the valve-seat is provided with both horizontal and vertical ports, and the valve is composed of inclined rings suitably connected in the same manner as shown in Fig. 1, said rings being adapted to close the valve-ports, so that the valve may, when desired, be reciprocated vertically, so as to admit of the passage of fluid both through the horizontal and the vertical ports.

In carrying out our invention we do not desire to limit ourselves to the precise methods of construction herein shown and described, but reserve the privilege of making any modifications and alterations which may be resorted to without departing from the spirit of our invention.

The invention described herein is designed particularly to be employed in combination with the steam-pump which is made the subject-matter of an application filed by us July 7, 1888, No. 279,251 and in fact this application embraces in Fig. 1 of the drawings substantially the same plunger that was canceled from said application upon the requirement of division.

In Fig. 1 the lower edges of the rings or bands I are inclined downwardly to compensate for wear. The openings E in the conical portion have their upper and lower walls inclined downwardly for a similar purpose. The same is true of the construction shown in Figs. 2 and 3, and indeed wherever there is a tendency to wear we have beveled or inclined the walls of the ports in the valve-seat and correspondingly beveled or inclined the edges of the rings or bands of the conical valve. By this means we compensate for wear and always present a new wearing-surface and preventing the upper edges of the rings or bands slipping down past the ports or openings of the valve-seat.

It is to be observed that in each and every modification of our invention the meeting-faces of our improved valve and seat are of true and permanently conical shape, which is not in the least changed or affected by any amount of wear to which the device may be subjected. This is of the greatest importance, first, on account of convenience in manufacture, inasmuch as a valve of this shape may be very readily and easily ground to a seat, while almost any departure from this shape which shall involve the general principles of the invention would require the exercise of the finest mechanical skill in its production at a corresponding increase in cost; secondly, on account of the wearing qualities. In a valve of this construction no amount of wear will cause the valve to leak, it being specially important to notice that the valve is guided or drops to its seat without possibility of battering or injuring the latter, while any departure from the true conical shape, provided that the general principles of the invention are retained, will render even wear practically impossible, causing the valve soon to leak. Thirdly, our improved valve-seat, owing to its peculiar shape, renders it impossible for sand, grit, or obstructions of any kind to rest thereon. Any departure from such shape would involve at least such a possibility, to the evident detriment of the valve. Fourthly, no separate seat-rings are required, thus lessening the cost of production and avoiding danger of leakage.

A construction which aims at the objects of our invention, but which is particularly open to the several objections set forth, is shown in British Patent No. 2,391 of 1862. The construction therein shown, which is further objectionable for the reason that it involves the necessity of valve-guides which practically close and obstruct the upper and lower valve-ports, thus impairing the efficiency of the valve and its capacity for the passage of fluid, is disclaimed by us.

Having thus described our invention, what we claim, and desire to secure by Letters Patent of the United States, is—

1. In a pump piston or plunger, the combination, with a cylindrical body terminating at its upper end in a true conical valve-seat having suitable ports or openings, of a true conical metallic valve movable bodily upon the seat and having solid portions to cover the said ports or openings, and openings to admit of the passage of fluid, substantially as and for the purpose set forth.

2. A piston or plunger having a true conical valve-seat provided with suitable valve-ports, in combination with a true conical metallic valve mounted upon the said seat and movable bodily over the same, substantially as set forth.

3. A piston or plunger having a true conical valve-seat provided with suitable ports or openings, in combination with a true conical metallic valve mounted upon and movable bodily over the said seat and having solid portions to cover said openings, the edges of the said solid portions being beveled or inclined, substantially as set forth.

4. A piston or plunger having a true conical valve-seat provided with annular or circumferential ports or openings, in combination with a true conical metallic valve movable bodily upon the said seat and comprising a series of tapering rings adapted to cover the said ports or openings, and ribs or braces connecting the said rings, the edges of the latter being beveled or inclined, substantially as set forth.

5. The combination of a piston or plunger having a true conical valve-seat provided with suitable ports, a true conical metallic valve movable bodily upon the seat and comprising a series of rings adapted to close the said ports and connected by suitable ribs or braces, and the plunger-rod connected to the upper end of the valve-seat forming a guide for the valve and having a shoulder to limit the vertical movement of the latter, substantially as herein set forth.

6. A true conical valve-seat having ports or openings the walls of which are beveled or inclined, combined with the true conical metallic valve movable bodily upon the said seat and having rings or bands to close the ports, said rings or bands having their edges beveled or inclined, for the purpose set forth.

In testimony that we claim the foregoing as our own we have hereto affixed our signatures in presence of two witnesses.

ROBERT M. DOWNIE.
    JOHN G. DOWNIE.

Witnesses:
 J. F. MERRIMAN,
 JOHN REEVES.